Dec. 28, 1943.　　　　L. G. COX　　　　2,337,546
PROPELLER FRICTION TEST TOOL
Filed Nov. 14, 1942
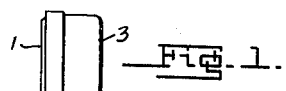
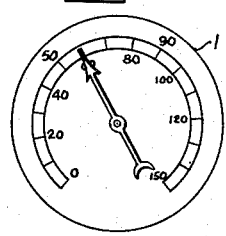
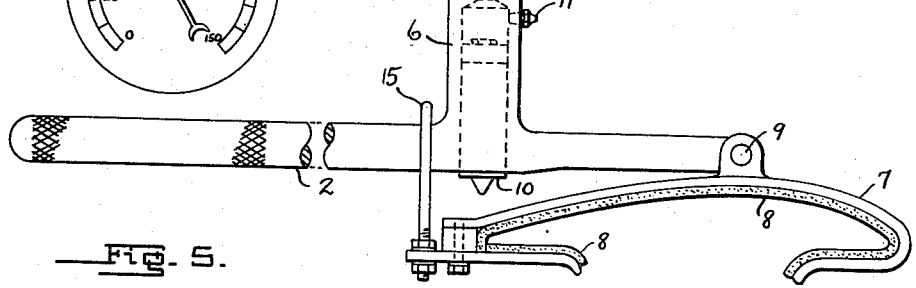
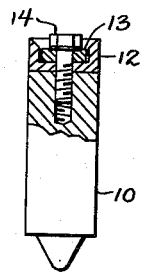
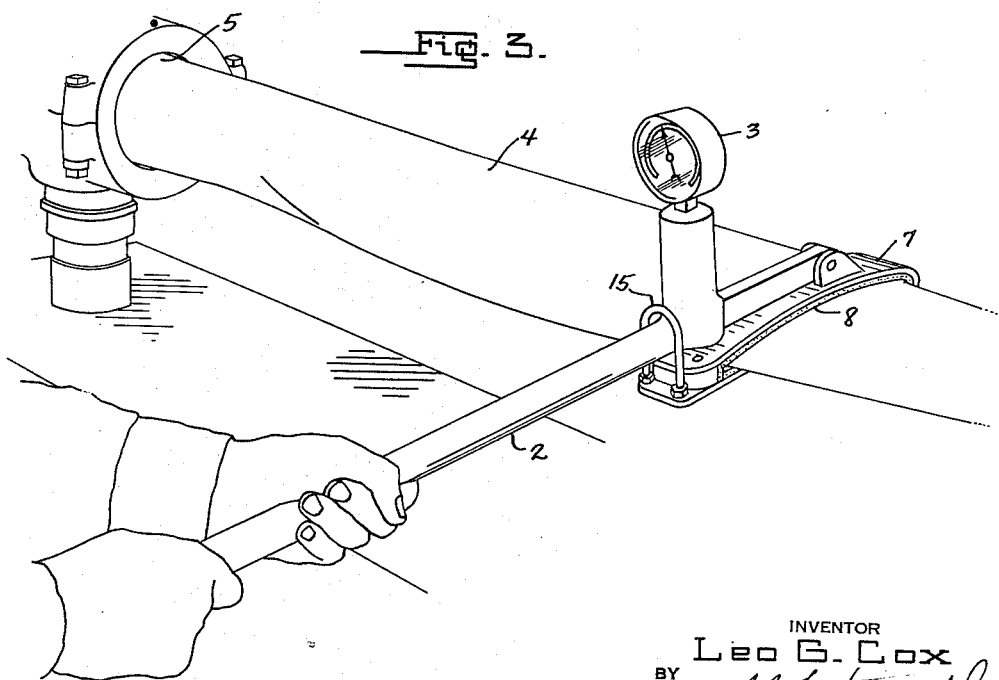
INVENTOR
Leo G. Cox
BY
ATTORNEY

UNITED STATES PATENT OFFICE 2,337,546

PROPELLER FRICTION TEST TOOL

Leo G. Cox, Pensacola, Fla.

Application November 14, 1942, Serial No. 465,567

6 Claims. (Cl. 265—10)

(Granted under the act of March 3, 1883, as amended April 30, 1928; 370 O. G. 757)

This invention deals with torque measuring devices, by means of which the amount of torque required to turn a rotatable object or to keep it from being turned is measured and indicated while this torque is being manually applied by the aid of the device itself. The devices illustrated and described herein are particularly adapted to measure the friction in the mechanism of variable pitch propeller blades and the like.

The object of this invention is to construct a simple, durable and rugged device for the above purposes.

A further object is to make this device adaptable for measuring the torque necessary to turn any rotatable device regardless of its shape or size.

By way of example, the mechanism shown herein is an adaptation of the torque measuring device so as to produce a testing tool specifically for measuring the friction in the mechanism of variable pitch propellers. Further objects of the present invention will appear in the following description of the details thereof, accompanied by the drawing in which:

Fig. 1 is a side view of the specific form of this device;

Fig. 2 shows the dial of the gauge used therein;

Fig. 3 is a perspective view of the tool being applied to a propeller blade;

Fig. 4 is a reduced size of band used in connection with this tool, for a smaller size propeller blade, and Fig. 5 is a partial section of the plunger element used in the cylinder of the tool.

The specific form of the present invention shown in the drawing is adapted for use in testing the torque required to turn the propeller blades of variable pitch propellers. Certain controllable, constant speed, hydromatic and electric propellers have to be checked for tightness of the fit of the blade in the hub assembly. This is determined by measuring the amount of torque necessary to turn each blade in its socket. This is usually done by the use of a lever arm clamped to the blade at a definite distance from the hub and a set of spring scales or weights attached to the other end of the lever arm and sufficient pull or weight added to turn the blade. This pull or weight in pounds, multiplied by the distance in feet from the point of application to the center line of the blade axis is the torque in pounds feet, which should conform to the specifications requirements. The torque required for each blade has to be within (plus or minus) a certain number of foot pounds of each other to obtain a smooth working propeller.

By the use of the present test tool this torque is measured and a direct reading in foot pounds given on a 3" dial 1. Several trial readings can be had by simply reversing the pressure applied by hand to the handle 2 of the tool. Fig. 3 shows the tool in operation. Note pressure gauge 3 which shows reading in foot pounds required to turn the blade 4 in its socket 5.

This tool is simple in construction and operation, requiring one man but a few seconds to install and test a blade. By making several trial tests it can be determined if the blade is sticking or slipping smoothly against its shim plates, where the old method would only show weight or pull required to start the blade moving.

This specific tool measures 33" overall and weighs twelve pounds. Fig. 1 shows a side view of the tool, and Fig. 2 shows the gauge dial. The handle 2 and cylinder 6 are forged in one piece of cold rolled steel. The strap 7 is bent to fit the shape of blade 4 at the proper distance from the hub and is made of ¼" x 2" cold rolled steel, leather lined at 8 to prevent scratching the blade. The handle 2 is hinged to the strap at the center line 9 of the axis of the blade and the center of the cylinder 6 is six inches from the center of the hinge pin, which gives a six inch fulcrum arm from the center of the blade axis to the center of the cylinder plunger 10. The cylinder is bored to one square inch or a diameter of 1.1285" and a standard 0 to 300 pound gauge 3 of 3" diameter is mounted on top of the cylinder. The dial of this gauge has been changed to read 0 to 150 pounds, as shown in Fig. 2, which shows half of the actual pressure applied. This is done to compensate for the six inch leverage instead of the twelve inch leverage required to give a direct reading of foot pounds on a standard pressure gauge. The changing of the dial reading not only compensates for the six inch leverage but allows the tool to be considerably shorter and more compact and lighter. The use of two sizes of straps (one large Fig. 1 and one small Fig. 4) covers the range of blade widths very nicely for most propellers now in use.

A standard ⅛" Zerk fitting 11 is installed near the top of the cylinder as shown in Fig. 1, for filling the cylinder with a standard soft grease. All air should be expelled from the cylinder by removing the gauge. The cylinder should not be filled to the extent that the plunger will be forced out against its pivoting point. There should be at least ⅛" space between the plunger point and blade strap. The U-bolt 15 should permit this clearance while furnishing means whereby reverse torque may be applied to turn the propeller blade back to the starting position.

Fig. 5 shows the details of the plunger unit that may be used in connection with this tool, 10 being the plunger, 12 a flexible sealing member, 13 a washer and 14 a bolt that holds the sealing assembly on the head of the plunger.

Various modifications in shape and size of the several parts of this device may be made without departing from the general form of the mechanism or from the scope of the appended claims.

This invention may be used by or for the Government of the United States for governmental purposes without the payment of any royalties thereon or therefor.

What I claim is:

1. A torque measuring device for determining the amount of torque necessary to turn or keep from turning a rotatable mechanism comprising a gripping means for gripping the mechanism, a lever pivoted at one end to the gripping means and having a handle to which force is manually applied at the other end, a U-bolt passed through and fixed in a portion of the gripping means and loosely looped over the handle in such a manner as to positively provide a small angular clearance between the gripping means and the handle, a cylinder formed on the handle having an open end adjacent and normal to the gripping means at a distance from the pivot, a plunger in said cylinder having a projection on the outer end thereof movable against the gripping means, and a pressure gauge mounted directly in the other end of the cylinder with its dial turned toward the handle end of the lever.

2. A torque measuring device for determining the amount of torque necessary to turn or keep from turning a rotatable mechanism comprising a gripping means for gripping the mechanism, a lever pivoted at one end to the gripping means and having a handle to which force is manually applied at the other end, a U-bolt passed through and fixed to a portion of the gripping means and looped over the handle in such a manner as to allow a small angular clearance between the gripping means and the handle, a cylinder formed on the handle having an open end adjacent and normal to the gripping means at a distance from the pivot, a plunger in said cylinder having a projection on the outer end thereof movable against the gripping means, a pressure gauge mounted directly in the other end of the cylinder with its dial turned toward the handle end of the lever and means at the end of the cylinder near the gauge for introducing a fluid into the cylinder.

3. A torque measuring device having two members pivotally connected and having pressure responsive means including a pressure gauge facing away from the pivot to measure the torque exerted between them, one of said members having gripping means for application to a rotatable mechanism so that the axis of the pivot is parallel but eccentric to the axis of rotation of said mechanism, the other member having a handle whereby to apply the turning force to the mechanism through the pressure responsive means in a direction circumferentially with respect to the axis of rotation.

4. A torque measuring device having two members pivotally connected and having pressure responsive means including a pressure gauge facing away from the pivot to measure the torque exerted between them, one of said members having gripping means for application to a rotatable mechanism so that the axis of the pivot is parallel but eccentric to the axis of rotation of said mechanism, the other member having a handle whereby to apply the turning force to the mechanism through the pressure responsive means in a direction circumferentially with respect to the axis of rotation, and a U-bolt loosely looped over one member and fastened in the other positively furnishing a small angular clearance between said members to relieve the pressure on the pressure responsive means when the device is not in use.

5. A friction testing tool for measuring the torque required to turn a propeller blade comprising a padded gripping means for the propeller blade, a lever pivotally joined to said gripping means on an axis parallel but eccentric to the axis of rotation of said propeller blade and having a pressure responsive device including a gage facing away from said pivot for indicating the torque which has to be applied to the propeller blade in order to turn it, said pressure responsive device also including a cylinder formed integrally with the lever and a plunger member fitted therein and having a projection adjacent the gripping means at a measured distance from the axis of rotation, the gage having a scale for reading directly in foot pounds.

6. A tool for applying and indicating the amount of torque applied to a rotatable part comprising a gripping means fitting the part, a lever hinged to the gripping means in a plane passing through the axis of rotation of said part and having a pressure indicating device mounted thereon so that its pressure responsive element rests against the gripping means when a force is applied to the lever to turn said part, the pressure indicating device facing toward the outer end of the lever and having a scale indicating directly the foot pounds of torque applied to the part by said tool, and a U-bolt passed loosely over said lever and through said gripping means to positively provide only a small amount of angular clearance between said gripping means and said lever and so that the tool may be turned in reverse direction by said lever acting on said stop means.

LEO G. COX.